United States Patent Office 3,575,914
Patented Apr. 20, 1971

3,575,914
POLYMERIC MATERIALS WHICH ARE THE REACTION PRODUCT OF (A) A PRIMARY POLYAMINE AND (B) A POLYCARBOXYLIC ANHYDRIDE WHICH IS THE THERMAL CONDENSATION PRODUCT OF (1) AN AROMATIC INTRAMOLECULAR CARBOXYLIC ANHYDRIDE (2) AROMATIC POLYSULFONYL HALIDE (3) OTHER AROMATICS
Frank Long, Wrexham, and Gordon Roy Ensor, Llangollen, Wales, assignors to Monsanto Chemicals Limited, London, England
No Drawing. Filed Jan. 29, 1968, Ser. No. 701,107
Claims priority, application Great Britain, Feb. 3, 1967, 5,362/67
Int. Cl. C08g 20/32
U.S. Cl. 260—30.2         14 Claims

ABSTRACT OF THE DISCLOSURE

Disclosed herein are polymeric materials characterized by having a plurality of recurring imide linkages and direct linkages between aromatic nuclei. These materials are the polymeric reaction product of (1) a polycarboxylic anhydride which is the thermal condensation product of (a) an aromatic polysulphonyl halide, (b) an aromatic intramolecular carboxylic anhydride, and (c) a third aromatic compound; and (2) a polyamine having at least two primary amino groups per molecule.

CROSS-REFERENCES TO RELATED APPLICATIONS

This application claims the right of priority of British patent application No. 5,362/62, filed Feb. 3, 1967 and British patent application No. 1,018/68 which is a divisional application of British patent application No. 5,362/67 and which claims the same Feb. 3, 1967 filing date as British patent application No. 5,362/67.

BACKGROUND OF THE INVENTION (1) Field of the invention

This invention relates to novel polymeric materials. More particularly this invention relates to novel polymeric materials characterized by having a plurality of recurring imide linkages and direct linkages between aromatic nuclei. These materials are the polymeric reaction product of (1) a polycarboxylic anhydride which is the thermal condensation product of (a) an aromatic polysulphonyl halide, (b) an aromatic intramolecular carboxylic anhydride and (c) a third aromatic compound; and (2) a polyamine having at least two primary amino groups per molecule.

(2) Description of the prior art

Polymeric compositions containing a plurality of recurring imide linkages are well known in the art as is evidenced by U.S. Patents 3,179,633, 3,179,634, 3,179,635, 3,190,856 and others. The polymers described in the foregoing references are characterized by having good thermal stability and other physical properties. However, the increasing demands of modern technology is requiring new polymeric materials with even better physical properties than is found in those polymeric materials currently available. A problem exists in the art in providing new polymeric materials with superior physical properties which will meet the requirements of modern technology.

SUMMARY OF THE INVENTION

This invention relates to novel polymeric materials characterized by having a plurality of recurring imide linkages and direct linkages between aromatic nuclei. These materials are the polymeric reaction product of (1) a polycarboxylic anhydride which is the thermal condensation product of (a) an aromatic polysulphonyl halide, (b) an aromatic intramolecular carboxylic anhydride, and (c) a third aromatic compound; and (2) a polyamine having at least two primary amino groups per molecule.

This invention solves a problem of long standing in the art by providing polymeric materials with high thermal and oxidative stability which are suitable for use in the fabrication of articles that are required to withstand prolonged periods of service at high temperatures.

It is therefore an object of this invention to provide new polymeric materials having high thermal and oxidative stability.

It is another object of this invention to provide a process for the production of new polymeric materials having high thermal and oxidative stability.

The foregoing and other objects are obtained by the reaction of (1) a polycarboxylic anhydride which is the thermal condensation product of (a) an aromatic polysulphonyl halide, (b) an aromatic intramolecular carboxylic anhydride having replaceable nuclear hydrogen atoms, and (c) a third aromatic compound having replaceable nuclear hydrogen atoms under conditions such that sulphur dioxide and a hydrogen halide are evolved, the anhydride being one which, except by virtue of having replaceable nuclear hydrogen atoms, is inert with respect to the sulphonyl halide, and the third aromatic compound being one which, except by virtue of having replaceable nuclear hydrogen atoms, is inert with respect to the sulphonyl halide and is inert with respect to the anhydride, with (2) a polyamine containing at least two primary amino groups per molecule.

DESCRIPTION OF THE PREFERRED EMBODIMENTS

The polycarboxylic anhydrides for use as starting materials in the production of the polymers of the present invention are those described in British patent specification No. 36,742/66. These aromatic polyanhydrides are produced by a process which comprises heating (a) an aromatic polysulphonyl halide (that is to say an aromatic sulphonyl halide containing at least two sulphonyl halide groups each linked to a nuclear carbon atom), (b) an aromatic intramolecular carboxylic anhydride having replaceable nuclear hydrogen atoms, and (c) a third aromatic compound having replaceable nuclear hydrogen atoms, under conditions such that sulphur dioxide and a hydrogen halide are evolved, the anhydride being one which, except by virtue of having replaceable nuclear hydrogen atoms, is inert with respect to the sulphonyl halide, and the third aromatic compound being one which, except by virtue of having replaceable nuclear hydrogen atoms is inert with respect to the sulphonyl halide and is inert with respect to the anhydride.

A typical polyanhydride is one obtainable from benzene-m-disulphonyl chloride, phthalic anhydride and terphenyl. Polyanhydrides having a range of properties and various proportions of anhydride units can be produced, depending for example on the ratio of the reactants employed in the process. These ratios are usually chosen, then the process is carried out under such conditions, that the product is fusible and is soluble in such solvents as chloroform.

The aromatic sulphonyl halide used in the production of a polyanhydride can be a compound containing one or more aromatic nuclei, and where it contains more than one nucleus, the sulphonyl halide groups can be linked to carbon atoms of the same nucleus or to carbon atoms of different nuclei. A preferred class of polynuclear aromatic sulphonyl halides are those that contain from two to four aromatic nuclei arranged in a sequence, successive nuclei in the sequence being linked directly or through an intermediate atom or group, for example an oxygen or sulphur atom, or a carbonyl, sulphonyl, phosphonyl or silicon group.

The nucleus or nuclei in the sulphonyl halide can be carbocyclic or heterocyclic, but carbocyclic nuclei, such as for instance benzene or naphthalene nuclei, are usually preferred. Useful properties are, however, also associated with nuclei having a heterocyclic ring fused to one or more carbocyclic rings, for example dibenzothiophen or dibenzofuran nuclei. Thus the sulphonyl halide can, for example, be a sulphonyl halide derivative of benzene; naphthalene; a polyaryl, especially a polyphenyl such as for instance biphenyl or terphenyl; an aryl ether, especially a phenyl ether, for example diphenyl ether or a bis(phenoxy)benzene; and aryl sulphide or sulphone, for example diphenyl sulphide, a dinaphthyl sulphide or diphenyl sulphone; dibenzothiophen; or of dibenzofuran.

The nucleus or nuclei of the aromatic sulphonyl halide can contain one or more substituents in addition to the sulphonyl halide groups. Such a substituent can be selected from a range of atoms or groups, including for instance halogen atoms, alkyl groups and alkoxy groups. In this respect, however, preferred polyanhydrides are those derived from unsubstituted aromatic sulphonyl halides or from aromatic sulphonyl halides having one or more fluorine or chlorine atoms as additional nuclear substituents.

The sulphonyl halides usually employed in practice are the sulphonyl chloride although the sulphonyl bromides for example can also be used.

Specific examples of suitable aromatic sulphonyl halides are: benzene-1, 3-disulphonyl chloride; benzene-1, 3-disulphonyl bromide; 2,4,5,6-tetrachlorobenzene-1, 3-disulphonyl chloride; naphthalene-1, 5-disulphonyl chloride; naphthalene-2, 7-disulphonyl chloride; naphthalene-1,3,6-trisulphonyl chloride; diphenyl-4,4'-disulphonyl chloride; dephenyl ether-4,4'-disulphonyl chloride; diphenyl sulphide-4,4'-disulphonyl chloride, dibenzothiophen-2, 8-disulphonyl chloride and dibenzofuran - 3,7 - disulphonyl chloride.

The aromatic carboxylic intramolecular anhydride that is used in the production of a polyanhydride can contain one or more anhydride groupings, one or more aromatic nuclei, and, consistent with the requirement that nuclear hydrogen atoms should be present one or more additional, inert, nuclear substituents, for example, halogen atoms, in particular fluorine or chlorine atoms. Preferred anhydrides are those that are unsubstituted or that contain not more than two halogen atoms per aromatic nucleus.

The nucleus or each nucleus of the aromatic anhydride is generally carbocyclic, for instance a benzene or naphthalene nucleus, although desirable properties are also associated with nuclei having a heterocyclic ring fused to one or more carboxyclic rings, for example dibenzothiophen or dibenzofuran nuclei. Where more than one aromatic nucleus is present, these can be linked to each other directly or indirectly, for example through an oxygen or sulphur atom, or through an alkylene, carbonyl, sulphonyl, phosphonyl or silicon group.

Aromatic anhydrides containing more than one anhydride grouping are preferably compounds that also contain more than one aromatic nucleus, such that only one anhydride grouping is associated with any one nucleus.

Examples of anhydrides suitable for use in the present invention include phthalic anhydrides, the monochlorophthalic anhydrides; the phenylphthalic anhydrides, naphthalic anhydride; 3,3',3,3'-biphenyl tetracarboxylic dianhydride; diphenyl sulphone 3,3',4,4'-tetracarboxylic dianhydride; pyromellitic dianhydride; 2,3,6,7-naphthalene tetracarboxylic dianhydride, 3,3',4,4'-diphenyl tetracarboxylic diahydrides; 1,2,5,6-naphthalene tetracarboxylic dianhydride; 2,2',3,3'-diphenyl tetracarboxylic dianhydride; 2,2-bis(3,4-dicarboxyphenyl)propane dianhydride; bis(3,4 - dicarboxyphenyl)sulfone dianhydride; 3,4,9,10-perylene tetracarboxylic dianhydride; bis(3,4-dicarboxyphenyl)ether dianhydride; naphthalene - 1,2,4,5 - tetracarboxylic dianhydride; naphthalene-1,4,5,8-tetracarboxylic dianhydride; 2,6-dichloronaphthalene - 1,4,5,8 - tetracarboxylic dianhydride; 2,7 - dichloronaphthalene - 1,4,5,8-tetracarboxylic dianhydride; 2,3,6,7 - tetrachloronaphthalene-1,4,5,8-tetracarboxylic dianhydride; phenanthrene-1,8,9,10-tetracarboxylic dianhydride; 2,2 - bis(2,3 - dicarboxyphenyl)propane dianhydride; 1,1-bis(2,3-dicarboxyphenyl)ethane dianhydride; 1,1-bis(3,4-dicarboxyphenyl) ethane dianhydride; bis(2,3-dicarboxyphenyl)methane dianhydride; bis(3,4-dicarboxyphenyl)methane dianhydride; bis(3,4 - dicarboxyphenyl)sulfone dianhydride; benzene-1,2,3,4 - tetracarboxylic dianhydride; 3,4,3',4' - benzophenone tetracarboxylic dianhydride; 2,3,2',3'-benzophenone tetracarboxylic dianhydride; 2,3,3',4'-benzophenone tetracarboxylic dianhydride, etc. Especially preferred is phthalic anhydride.

The third aromatic compound used in the production of a polyanhydride can be one having one or more aromatic nuclei. The nucleus or nuclei can be carbocyclic or heterocyclic, but carbocyclic nuclei such as for instance benzene and naphthalene nuclei and nuclei having a heterocyclic ring fused to one or more carbocyclic rings as for example in dibenzothiophen and dibenzofuran nuclei, are usually preferred.

A particularly suitable group of aromatic compounds are those containing a sequence of two or more aromatic nuclei, successive nuclei being linked to each other directly or through an oxygen atom, a sulphur atom, a methylene or other linking group, for example a carbonyl, sulphonyl, phosphonyl or silicon group. The nuclei in these compounds are preferably carbocyclic nuclei, for example benzene or naphthalene nuclei, or nuclei containing a thiophen or furan ring fused to one or more carbocyclic aromatic rings, for example dibenzothiophen or dibenzofuran nuclei. The compounds thus include for example polyaryls, for instance polyphenyls, aryl ethers and polyaryl ethers, aryl sulphides and polyaryl sulphides, aryl sulphones arylmethylated (for example benzylated) polyaryls, dibenzofuranyl aryl ethers, dibenzothienyl polyaryls, and polyaryl dibenzothiophens.

Examples of aromatic compounds that can be used are: biphenyl; terphenyl; binaphthyl; quinquephenyl; sexiphenyl; septaphenyl; diphenoxy-terphenyl; diphenoxy-quaterphenyl; bis-phenoxy-biphenylyl ether; bis-phenylthio-biphenylyl ether; diphenyl sulphone, bis(dibenzothienyl)benzene; and bis-dibenzofuranyldiphenyl ether.

A further group of aromatic compounds that are suitable for use as the third components in the production of a polyanhydride are silicon-containing aromatic compounds. Preferred compounds contain more than one aromatic nucleus and are such that each aromatic nucleus is bonded to a silicon atom or to another aromatic nucleus either directly or through an oxygen atom, and each silicon atom is bonded either directly to an aromatic nucleus or through an oxygen atom to an aromatic nucleus or to another silicon atom.

Compounds having such an arrangement of aromatic nuclei and silicon atoms may be of various degrees of molecular complexity, and include such materials as for example tetraphenyl silane, tetraphenyl orthosilicate, diphenyl diphenoxy silane; phenyl tri(3-phenoxyphenoxy); the isomeric di(triphenylsiloxy) benzenes; the aromatic silicones, for example the cyclic aromatic siloxanes, such as for instance hexaphenylcyclotrisiloxane and octaphenylcyclotetrasiloxane, and the corresponding linear oligomers, and polysilicate polyesters that can be obtained by the condensation of a diaromatic dihalosilane, for example diphenyldichlorosilane, with a dihydric phenol. In general, the silicon containing aromatic compounds that are suitable for the production of the polyanhydrides of the present invention are substantially the same as those useful for the production of silicon-containing aromatic polymers according to British patent specification No.

1,049,715, in which specification such compounds are more fully described.

Subject to the requirements that the third aromatic compound should contain replaceable nuclear hydrogen atoms, and should be inert with respect to the anhydride, and, except by virtue of having replaceable nuclear hydrogen atoms, with respect to the aromatic sulphonyl halide, the third compound may contain one or more additional nuclear substituents. Such substituents include halogen atoms, for example fluorine, chlorine or bromine atoms. Preferred aromatic compounds are those that are unsubstituted or that contain not more than two halogen atoms per aromatic nucleus.

Several procedures are available for operating the process for the production of the aromatic polyanhydrides. In a preferred method, the sulphonyl halide is added gradually or in stages to a mixture of the anhydride and the third aromatic compound at the reaction temperature, but alternatively the total quantities of reactants to be used can be mixed initially, or a mixture of the sulphonyl chloride and a portion of the aromatic compound can be added gradually to a mixture of the remainder of the aromatic compound and the anhydride. The isolation of one or more polymers containing carboxylic groups is generally straightforward, especially when the sulphonyl chloride is added in stages, should such isolation be desired.

A temperature of not less than about 175° C. is generally required for a practical reaction rate in the process, and preferred temperatures are generally higher than this, for example in the range 190° C. to 475° C., especially in the range 200° C. to 400° C. Heating is normally continued until the evolution of sulphur dioxide and hydrogen halide is substantially complete.

A catalyst is not essential, but one can be used if desired, for example one of the catalysts for the arylation process described in British patent specification No. 959,605. Copper and copper compounds, for example copper halides, are among the most effective catalysts. A catalyst is preferably used in an amount of from about 0.001 to about 0.1 mol per mol of the aromatic sulphonyl halide.

As indicated above, polyanhydrides having a range of anhydride contents can be obtained by varying the proportions of the reactants. In general, the rate of reaction of the sulphonyl halide with the aromatic hydride is less than its rate of reaction with the third aromatic compound, so that an excess of the anhydride relative to the amount which it is desired to incorporate in the resin is usually employed.

Preferred polycarboxylic anhydride starting materials are those obtainable using from 0.5 to 2.5 moles of anhydried per equivalent of the polysulphonyl halide (equivalent weight=molecular weight divided by the number of sulphonyl halide groups) and a molar ratio of the third aromatic compound to the aromatic polysulphonyl halide not greater than the number of sulphonyl halide groups in the polysulphonyl halide. Where the polycarboxylic anhydride is derived from benzene disulphonyl chloride, phthalic anhydride and terphenyl, the preferred ratios are 1.5 to 3 moles of phthalic anhydride and 0.4 to 0.9 mole of terphenyl per mole of benzene disulphonyl chloride. Any of the anhydride or third aromatic compound that has not reacted when evolution of sulphur dioxide and hydrogen halide is substantially complete can be recovered, for example by distillation of the reaction mixture under reduced pressure.

The ratios of reactants and the duration of heating is selected to give polyanhydrides which are fusible, soluble materials. Polyanhydrides of this type are usually obtained using the preferred proportions of reactants referred to above, even when the reaction is taken substantially to completion as indicated by evolution of 80% or more of the theoretical quantities of sulphur dioxide and hydrogen halide.

The polymers of the present invention are obtained by the direct condensation of the anhydride reactant with the polyamine reactant, but alternatively a polymer-forming derivative of the anhydride, for example the corresponding acid or a partial ester and/or salt of the corresponding acid is used. These polymer-forming derivatives of the anhydride are well known to those skilled in the art. The polymers of the invention referred to above as having high thermal stabilities are polyimides, but the invention also includes polyamic acids formed by the condensation of the polyanhydride and the amine under mild reaction conditions. The polyamic acids are converted to polyimides on dehydration, and constitute a useful intermediate form of polyimide precursor.

The polyamine monomeric components used in the present invention are represented by the following general formula:

$$R(NH_2)_n \qquad (I)$$

wherein R is an n-valent aromatic radical of from 2 to 52 carbon atoms.

The polyamines used in the practice of the present invention include diamines characterized by the formula: $R(NH_2)_2$ wherein R is a divalent radical containing at least two carbon atoms selected from the following groups: aliphatic, aromatic, cycloaliphatic, combination of aromatic and aliphatic, heterocyclic and bridged aromatic radicals wherein the bridging group in a divalent radical selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silyl and derivatives thereof. The preferred R groups in the diamines are in aromatic amines containing at least one ring of 6 carbon atoms, characterized by benzenoid unsaturation. Such R groups include para-phenylene, meta-phenylene, bisphenyl radicals, fused ring systems having 2 to 4 aromatic nuclei, wherein the two amine groups would be located on separate aromatic nuclei and bridged organic radicals of the general formula:

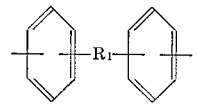

(II)

wherein $R_1$ is a divalent radical selected from the group consisting of an alkylene radical of from 1 to 6 carbon atoms, arylene radicals of from 6 to 16 carbon atoms, oxygen, —NH—, carbonyl, sulfonyl, phosphonyl and silyl radicals wherein the substituent groups on the phosphonyl and silyl radicals are aryl and alkaryl groups of from 6 to 16 carbon atoms, and those structures wherein the $R_1$ group is a divalent linking moiety joining the aromatic nuclei by ester, amide and thioester linkages.

Among the diamines which are suitable for use in the present invention are: meta-phenylene diamine; para-phenylene diamine; 4,4'-diamino-biphenyl 4,4'-diamino-diphenyl propane; 4,4'-diaminobenzophenone; 3,3'-dichlorobiphenyl; 4,4'-diphenyl methane; benzidine; 4,4'-diamino-diphenyl sulfides; 4,4'-diamino-diphenyl sulfone; 3,3'-diamino-diphenyl sulfone; 4,4'-diamino-diphenyl ether; 2,6-diamino-pyridine; bis-(4-amino-phenyldiethyl silane; bis-(4-amino-phenyl)diphenyl silane; bis-(4-amino-phenyl)-N-methyl amine; 1,5-diamino naphthalene; 3,3'-dimethyl-4,4'-diamino-diphenyl; 3,3'-dimethoxy benzidine; 2,4-bis(beta-amino-t-butyl)toluene; bis-(para-beta-amino-t-butyl-phenyl)ether; para-bis-(2-methyl-4-amino-pentyl)benzene; para-bis-(1,1-dimethyl-5-amino-pentyl) benzene; m-xylylene diamine; p-xylylene diamine; bis (para-amino-cyclohexyl)methane; ethylenediamine, 1,3-propylenediamine; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamino-dodecane; 1,2-bis-(3-amino-propoxy)ethane; 2,2-dimethyl propylene diamine; 3-methoxy-hexamethylene diamine; 2,5-dimethyl-hexamethylene diamine; 2,5-dimethyl-heptamethylene diamine; 5-methylnonamethylene diamine; 1,4-diamino-cyclohexane, 1,12-diamino-octadecane; 2,5-diamino-1,3,4-oxadiazole;

$H_2N(CH_2)_2O(CH_2)_3NH_2$; $H_2N(CH_2)_3NH_2$ $H_2N(CH_2)_3N(CH_3)(CH_2)_3NH_2$; 3,3'-dichloro-benzidine; bis-(4-amino-phenyl)ethyl phosphine oxide; bis-(4-amino-phenyl)-phenyl phosphine oxide; bis-(4-amino-phenyl)N-phenylamine; p-phenylene-bis-2(amino-1, 3-benzoxazole); 2,5,-bis(p-amino phenyl)-1,3,4-oxadiazole; m-phenylene-bis-(m-aminobenzamide); 3,4'-diamino benzanilide and mixtures of the foregoing. Other useful polyamino compounds include melamine, 4,4'-thioaniline diphenyl ether, 4,4'-diaminotriphenylamine, 1,2,4-triaminobenzene, polymethylene polyanilines made by the reaction of aniline with formaldehyde which correspond to the following general formula:

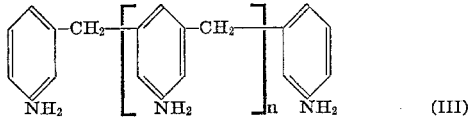

(III)

where $n$ can vary from 0 to 3; the reaction products of diacyl halides with excess diamines which correspond to the following general formula:

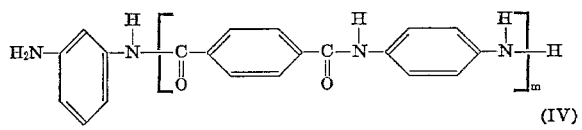

(IV)

where $m$ can be 1 to 4. Mixtures of these amines may be employed.

The polyamines illustrated in Formula III are prepared by the reaction of aniline and formaldehyde as is well known to those skilled in the art.

The general procedure for preparing these compounds is to react at least two (2) moles of aniline with one (1) mole of formaldehyde in the presence of an equivalent amount of concentrated hydrochloric acid. The aniline and hydrochloric acid are charged to a reaction vessel and formaldehyde (50%) is added at temperatures in the range of 50–90° C. The reactants are refluxed for about one hour at about 100° C., after which time the batch is cooled to at least 40° C. Equivalent amounts of sodium hydroxide are added to the batch. The layer containing the condensation product of the aniline and formaldehyde is then washed and steam distilled to remove any unreacted aniline.

Additional procedures for preparing these components may be found in U.S. Pats. 2,974,168 and 2,818,433.

The compounds represented by Formula IV are prepared by methods generally well known to those skilled in the art. In one method, these compounds are prepared by reaction of an aromatic diacyl halide with excess amount of an aromatic diamine. For example, reaction of iso- or ter-phthaloyl chloride with an excess of diamines such as m- or p-phenylene diamine, methylenedianiline, etc., as is illustrated below:

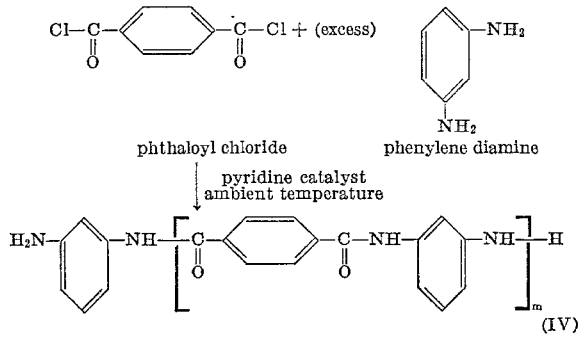

(IV)

Another method involves the reaction of one mole of an aromatic diacyl halide with two moles of a monofunctional aromatic amine carrying a nitro-substituent, and subsequent reduction of the nitro groups, as is illustrated below:

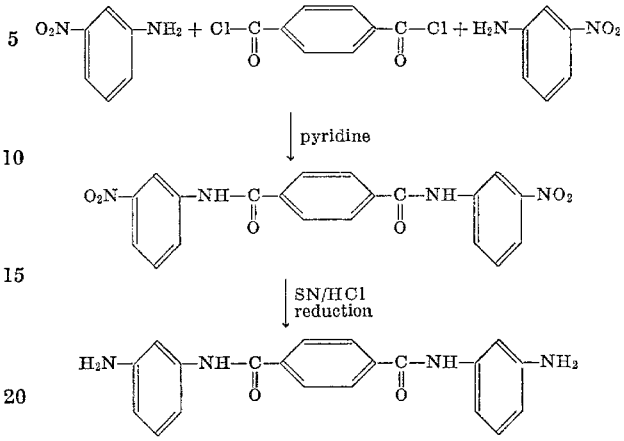

From the foregoing descriptions, those skilled in the art will readily recognize the methods and procedures used to prepare those compounds represented by Formulae III and IV above.

In a diamine having the two amino groups on a single aromatic nucleus, such groups preferably occupy positions other than the ortho, and in diamines having more than one aromatic nuclei, the two amino groups are preferably located in different nuclei.

Although in the aromatic diamines normally employed the amino groups are the only nuclear substituents, there may be present one or more additional inert nuclear substituents, for example alkyl groups or halogen atoms.

The polymers of the present invention are obtained by the direct condensation of the polyanhydride and the polyamine. The proportions of monomers can vary from about 25% excess of the polyanhydride to about 25% excess of the polyamine. Preferred are equivalent amounts of polyanhydride and amine or amounts that are substantially so. The reaction between the polyanhydride is carried out in the molten state or in a solvent medium.

Preferred solvents are polar liquids such as for instance the N,N-di(lower alkyl) lower alkanolamides especially N,N-dimethylformamide and N,N - dimethylacetamide, N(lower alkyl)pyrrolidones, for example N-methylpyrrolidone, dimethyl sulphoxide, tetrahydrothiophene dioxide and hexamethylphosphoramide. Other solvents that can be used include lower alkyl alcohols of from 1 to 8 carbon atoms such as methanol, ethanol, etc., glycols such as ethylene glycol, propylene glycol; aminoalcohols such as N,N'-diethyl amino propanol; halogenated hydrocarbons, for instance chloroform, perchloroethylene and chlorobenzene, and oxygen-containing solvents for example dioxane; ketones such as acetone, methyl ethyl ketone; ethers and esters.

The first stage reaction product, especially when operating at a relatively low temperature, for instance between 20° C. and 60° C., is a polyamic acid. The conversion of this intermediate product to a thermally stable polyimide by the elimination of water between each amide grouping and its adjacent carboxylic acid grouping can be effected thermally or by the action of a chemical dehydrating agent. When heated alone, a temperature of at least 100° C., for example from 150 to 500° C. is generally required, temperatures in the range 200 to 400° C. being usual in practice. Dehydration can be effected at atmospheric pressure, but is advantageously conducted at reduced pressures. Chemical dehydrating agents that can be used include aliphatic acid anhydrides such as acetic anhydride, and carbodiimides. The solvent which may have been present during the formation of the polyamic acid will normally be removed before or during thermal dehydration, whereas chemical dehydrations requiring lower temperatures can often be conducted in the presence of the solvent.

In an alternative and preferred method for the production of the polymeric materials of the invention, the polyanhydride is first converted to a partial ester by reaction with a monohydric alcohol, generally one containing not more than 18, and preferably not more than 6 carbon atoms per molecule, for example methanol or ethanol, and the partial ester is then reacted with the amine. On subsequent heating, water and alcohol are eliminated to form imide linkages. The temperature required to effect this elimination is usually at least 100° C., for example from 150 to 500° C., and in practice temperatures of from 200–400° C. are most often employed.

The polyimide polymers of the invention are valuable as binding agents for use with fillers in the production of surface coatings, or with fillers or reinforcing materials, especially fibrous reinforcing materials, in the production of articles having high mechanical strengths. Where advantage is taken of the high thermal stabilities of the polymers, and the coating or article is intended for exposure to high temperatures, the filler or reinforcing material used is one which is itself refractory, for example silica, alumina, titania, zirconia, silicon carbide, or various aluminosilicates in powder form; or fibres or filaments of asbestos, silica, carbon, graphite, aluminum silicate, boron, boron nitride, refrasil, quartz, silicon carbide or glass.

In the production of such an article or coating, at least the final stages of the process during which imide groupings are formed to the extent that the polymer becomes substantialy insoluble and infusible, are carried out in the presence of the filller or reinforcing agent. The usual procedure involves the use of a solution of polymer-forming components, for example a mixture of the polyanhydride and polyamine, a mixture of a polyanhydride partial ester and polyamine, a polyamic acid, a partial ester-amine salt or a resin having a limited content of imide groupings consistent with its being soluble in the solvent. To obtain a high concentration of polymer-forming components in the solution it is sometimes advantageous to use a mixture of two or more of the various species. Suitable solvents include polar liquids such as N-alkylpyrrolidones especially N-methylpyrrolidone, N,N-dialkylcarboxamides, for instance N,N-dimethylformamide and N,N-dimethylacetamide, tetrahydrothiophene dioxide, dimethyl sulphoxide and hexamethylphosphoramide; and halogenated hydrocarbons, for example chloroform, perchloroethylene, and chlorobenzene.

The concentration of polymer-forming components in a solution for impregnation or coating is tyically in the range 30–50% by weight of the solution. The optimum, however, varies with the method of coating or the absorbency of the material to be impregnated. For example, where the coating is applied by spraying, or relatively thick sections of material are to be impregnated, more dilute and less viscous solutions containing for instance from 5 to 30% by weight of polymer-forming components or less, may be appropriate. On the other hand, solutions containing higher concentrations, for instance up to 75% by weight of polymer-forming components can be used for coatings that are applied by dipping.

In the usual procedure for the production of an article of high mechanical strength containing a fibrous reinforcing agent, a mass of the fibrous material is impregnated with a solution of polymer-forming components, and after removal of the solvent at a temperature depending on the volatility of the solvent, but usually up to 150° C., the composite body so obtained is subjected to an elevated temperature at whch polyimide formation will occur or continue. Articles can be produced where the ratio of polyimide to reinforcing agent lies within a wide range; for example the reinforcing agent can constitute from 10 to 80% by weight of the composite, but preferably constitutes from 20 to 60% of this weight. For fibrous material of a given absorbency, this ratio is determined largely by the concentration of polymer-forming components in the impregnating solution, which is selected accordingly.

Preferred articles of high mechanical strengths have a laminated structure. Such a structure can be formed by subjecting to pressure at polymerization temperatures an assembly of several superimposed sheets or mats of impregnated fibrous material. Pressures of for example from 25 p.s.i. to 750 p.s.i. or higher, for example up to 5000 p.s.i. and preferably from 50 to 600 p.s.i. can be used The strengths of the laminates can often be further increased by a period of post-curing, during which the laminate is stored, usually at ordinary pressures, at an elevated temperature. The temperature of storage can for example be from 200–376° C. and the duration from for example 12 to 200 hours.

Surface coatings can be applied using a melt or solution of polymer-forming components, and then cured by heating at a temperature at which polyimide formation occurs. A composition for use as a surface coating may be a "varnish" which varnish comprises a solution of polymer-forming components in an orgaic solvent, or it can contain a filler in finely-divided form. The filler can be one of those exemplified above, and typically has an average particle size in the range from 10 millimicrons to 50 microns. The amount of filler can vary from, for example, up to 80% of the combined weight of polymer-forming components and filler; preferably this percentage lies in the range 10 to 75. Coating compositions may also contain dehydrating agents as exemplified above.

In a preferred method of forming coatings, the surface, after the usual degreasing and cleaning, has applied to it one or two coatings of a "varnish" composition consisting essentially of a solution of polymer-forming components without filler. After drying, and optionally curing or partial curing, these are followed by one or more coatings of a filled composition. Drying temperatures are determined mainly by the volatility of the solvent employed. The coatings can be cured at temperatures in the range 200 to 400° C. The polyimides of the invention are of particular value for forming protective coatings on metal, especially ferrous metal, surfaces. The polymeric compositions of the present invention also find wide utility as molding powders, electric insulation, films, fibers, and when foamed, as thermal insulation.

The invention is illustrated by the following examples.

EXAMPLE 1

This example describes the production of a polyanhydride reactant used in the present invention.

The polyanhydride starting material is first obtained as follows:

A mixture of 100 grams (0.68 mole) of phthalic anhydride, 38.3 grams (0.166 mole) of isomeric terphenyls and 0.034 grams of copper is heated to boiling point in a reaction vessel equipped with a stirrer, a reflux condenser, a heated dropping funnel and a gas inlet tube. A slow stream of nitrogen is led into the reactor, while 75 grams (0.272 mole) of m-benzenedisulphonyl chloride is added from the dropping funnel to the stirred reaction mixture over a period of 6 hours 45 minutes. During this time the temperatures of the reaction mixture rises from 292° C. to 300° C.

Sulphur dioxide and hydrogen chloride are evolved and are led in the entraining stream of nitrogen into an absorber containing sodium hydroxide solution. Analysis of the contents of the absorber for sulphite and chloride at the end of the reaction shows that 97.7% of the theoretical amount of hydrogen chloride and 95.3% of the theoretical amount of sulphur dioxide has been evolved. 71 grams of unreacted phthalic anhydride are recovered from the reaction mixture by distillation at a pressure of 25 mm. of mercury, leaving 88 grams of polyanhydride containing 33% by weight of units derived from the phthalic anhydride. The polyanhydride which is characterized by a plurality of direct aromatic nuclei to aromatic nuclei linkages solidifies upon cooling.

EXAMPLE 2

This example is set forth to illustrate the preparation of a polymeric material having a plurality of recurring imide linkages and direct aromatic nuclei to aromatic nuclei linkages. A mixture of 10 grams of the polyanhydride (0.0223 mole of anhydride units) prepared in Example 1 and 1.2 grams of p-phenylenediamine is ground to a fine powder in a mortar and then transferred to a small flask fitted with a glass stirrer and thermometer. The mixture is heated and, after fusion, stirred. The mixture becomes progressively more viscous, and stirring is eventually discontinued. The temperature is taken to 300° C. for 30 minutes and the product is then allowed to cool.

The polymeric product is hard, insoluble and infusible. The excellent oxidative thermal stability of this material suggests its use wherever polymeric materials are subjected to prolonged exposure at high temperatures.

EXAMPLE 3

This example is set forth to illustrate the preparation of a multiply laminate using an impregnating resin which is characterized by having a plurality of recurring imide linkages and direct aromatic nuclei to aromatic nuclei linkages when said resin is cured.

For the preparation of an asbestos-reinforced laminate, 67 grams of the polyanhydride prepared in Example 1, is converted to a partial ethyl ester by refluxing under anhydrous conditions with 250 cc. of anhydrous ethanol for 60 hours. The bulk of the excess ethanol is then removed by evaporation under reduced pressure, leaving an alcohol-wet residue which is dissolved in 150 cc. of warm chloroform. This solution is then mixed with a chloroform solution containing p-phenylenediamine equivalent to the anhydride units present in the polyanhydride. The resulting solution is used to impregnate six 12 inch by 4 inch asbestos felt mats which are then stored overnight at room temperature to allow most of the chloroform to evaporate.

The six mats are placed one on top of another and pressed for 3 minutes at 6 tons (280 pounds per square inch) and 120° C., 3 minutes at 11 tons (513 pounds per square inch) and 120° C. and finally for 1 hour at 11 tons (513 pounds per square inch) and 320° C. to yield a laminate having high flexural strength and good thermal stability on aging in air at 300° C.

EXAMPLE 4

This example describes the use of a polymer of the present invention as a surface coating.

Preparation of the polyanhydride

The polyanhydride starting material is first prepared as follows:

A mixture of 200 grams (1.36 moles) of phthalic anhydride, 76.6 grams (0.33 mole) of terphenyls and 0.07 gram of copper (in the form fine wire) is heated to boiling point in a reaction vessel equipped with a stirrer, a reflux condenser, a heated dropping funnel and a gas inlet tube. A slow stream of nitrogen is led into the reactor while 150 grams (0.545 mole) of m-benzenedisulphonyl chloride is added from the dropping funnel to the stirred mixture over a period of 6 hours 15 minutes. During this time, the temperature of the reaction mixture rises from 294 to 302° C. The temperature is then raised to 305° C. for 30 minutes.

Sulphur dioxide and hydrogen chloride are evolved and are led in the entraining stream of nitrogen into an absorber containing sodium hydroxide solution. Analysis of the contents of the absorber for sulphite and chloride at the end of the reaction shows that 97.2% of the theoretical amount of hydrogen chloride and 95% of the theoretical amount of sulphur dioxide has been evolved. Excess phthalic anhydride is removed from the product by distillation at a pressure of 20–25 mm. of mercury up to a pot temperature of 380° C., leaving 175 grams of polyanhydride containing 36.8% by weight of phthalic anhydride units and having an equivalent weight of 200.

50 grams of the polyanhydride are converted into the partial ethyl ester by refluxing with 187 cc. of anhydrous ethanol for 70 hours. The bulk of the unreacted ethanol is removed by distillation at atmospheric pressure and the remainder under vacuum. The yield of partial ester is 57 grams.

Preparation of the coating composition

A "varnish" coating composition is prepared by dissolving 5.0 grams of polyanhydride, 1.43 grams of the partial ethyl ester and 0.844 gram of p-phenylene diamine in 40 cc. of N-methylpyrrolidone. In this formulation, the polyanhydride is equivalent to 80% of the p-phenylenediamine and the partial ester to the remaining 20%, and the solution contains 17.5% weight/volume of polymer-forming solids.

A filled coating composition is prepared from the same organic components and in addition an amount of filler equivalent to a percentage of the total solids, i.e. polymer-forming components plus filler, as shown in Table I, below. The filler is incorporated by adding the solution slowly, with grinding, to the filler in a mortar.

The samples coated are mild steel (BSS 24) bars, 2 x ¾ x ¼ inches in size. These are treated before coating by boiling for 2 hours in chloroform, followed by pickling for 15–30 minutes in 12% aqueous hydrochloric acid containing 0.05% diphenylthiourea as an inhibitor. The bars are then washed and scrubbed with scouring powder, rinsed repeatedly with distilled water, then with a methylated spirits/acetone mixture, and are placed under chloroform until ready for use.

Coatings are formed by heating a bar and spraying with the unfilled composition described above. After approximately 15 minutes, a second coat of the same composition is applied. This is followed by two or more coatings of filled composition applied and cured under conditions indicated in the table below. The reservoir containing the filled composition is shaken during spraying to ensure that it remained homogeneous.

TABLE I.—SUMMARY OF EXAMPLES 4(A)–4(D)

| Example | Filler and average particle size | Percent filler of total solids | Undercoat | Total number of coats and thickness | Application temp., ° C. | Cure conditions |
|---|---|---|---|---|---|---|
| 4(A) | Silica, 30 millimicrons. | 25 | 2 coats without filler. | ¹4 | 120–140 | 1½ hrs. at 300° C. |
| 4(B) | Silicon carbide, 12 microns. | 50 | ___do___ | 6 | 120–140 | Every 2nd coat ¾ hour at 300° C., finally 2 hours at 300° C. |
| 4(C) | Silica, 30.0 microns. | 50 | ___do___ | 6 | 120–140 | Every 2nd coat ½ hour at 300° C., finally 2 hours at 300° C. |
| 4(D) | Silicon carbide, 12 microns. | 50 | ___do___ | 6 | 110–130 | Do. |

¹ Including undercoat (4 thousandths).

In each example the coatings are found capable of withstanding prolonged periods in air at elevated temperatures up to 250° C. and were not visibly affected by immersion in 10% sulphuric acid at 90° C. for 1000 hours.

EXAMPLE 5

Example 4(B) is repeated here except that 3,3',4,4'-benzophenone tetracarboxylic dianhydride is used in place of the phthalic anhydride used in Example 4 in the preparation of the polyanhydride. The resulting surface coating had excellent oxidative thermal stability and resistance to sulphuric acid corrosion.

EXAMPLE 6

Example 4(B) is repeated here except that monochlorophthalic anhydride is used in place of the phthalic anhydride used in Example 1, in the preparation of the polyanhydride. The resulting surface coating had excellent oxidative thermal stability and resistance to sulphuric acid corrosion.

EXAMPLE 7

Example 4(C) is repeated here except that 3,3',3'3'-biphenyl tetracarboxylic dianhydride is used in place of the phthalic anhydride used in Example 4 in the preparation of the polyanhydride. The resulting surface coating had excellent oxidative thermal stability and resistance to sulphuric acid corrosion.

EXAMPLE 8

Example 4(C) is reepated here except that diphenyl sulphone 3,3',4,4'-tetracarboxylic dianhydride is used in place of the phthalic anhydride used in Example 4 in the preparation of the polyanhydride. The resulting surface coating had excellent oxidative thermal stability and resistance to sulphuric acid corrosion.

EXAMPLE 9

Example 4(D) is repeated here except that pyromellitic dianhydride is used in place of the phthalic anhydride used in Example 4 in the preparation of the polyanhydride. The resulting surface coating had excellent oxidative thermal stability and resistance to sulphuric acid corrosion.

EXAMPLE 10

This example is set forth to illustrate an unfilled thermally stable film prepared with the polymeric products of the present invention.

A polyanhydride of the type prepared in Example 1 is reacted with a two fold molar excess of ethanol to prepare a solution of the partial ethyl ester. The ethyl ester of the polyanhydride is then reacted with an equimolar amount of 4,4'-methylene dianiline in an N-methyl-pyrrolidone solvent. The solution is coated out on aluminum panels and heated at 135° C. for 15 minutes; 200° C. for 30 minutes and 300° C. for 30 minutes. The resulting polymeric film was thermally stable and had an excellent appearance.

EXAMPLE 11

This example is set forth to illustrate some of the variations that are possible in the preparation of the polycarboxylic anhydride.

In a number of preparations similar to those described in Examples 1 and 4, benzene-m-disulphonyl chloride is added over a period of 5½ to 6 hours to a refluxing mixture of phthalic anhydride and isomeric terphenyls containing a catalytic quantity of copper. The reaction mixture is held at reaction temperature for a further 1½–2 hours to give a total time at reaction temperature of about 7 hours. Unreacted phthalic anhydride is recovered by sublimation under reduced pressure. The molar ratios of reactants, and various features of the products, are set out in Table II below.

TABLE II.—PROPERTIES OF SOME CARBOXYLIC CONTAINING POLYPHENYLENE POLYMERS

| | Reactants | | | | Product | | | |
|---|---|---|---|---|---|---|---|---|
| | Molar ratios | | | | Percent P.A.,[3] by weight | M.W.[5] | Analysis | |
| Example | T[1] | B.D.S.[2] | P.A.[3] | E.W.[4] | | | C[6] | H[7] |
| 11(A) | 0.61 | 1.0 | 2.48 | 209 | 35.4 | 835 | 84.0 | 4.0 |
| 11(B) | 0.5 | 1.0 | 2.42 | 179 | 41.3 | 927 | 81.5 | 3.8 |
| 11(C) | 0.5 | 1.0 | 1.5 | 166 | 44.6 | | 81.1 | 3.9 |
| 11(D) | 0.4 | 1.0 | 2.4 | 169 | 43.8 | | 81.1 | 3.4 |

[1] Terphenyls.
[2] Benzene-m-disulphonyl chloride.
[3] Phthalic anhydride.
[4] Equivalent weight.
[5] Molecular weight.
[6] Percentage by weight of carbon.
[7] Percentage by weight of hydrogen.

The following Examples 12 to 20 are set forth to illustrate the wide variations that can be used in selecting the reactants used to prepare the polymeric compositions of the present invention. In each instance the polycarboxylic anhydride is prepared according to the procedures of Example 1 prior to being reacted with the polyamine component. In each example a thermally stable polymeric material is obtained. The reactants used are summarized in the following Table III.

TABLE III.—SUMMARY OF REACTANTS USED IN EXAMPLES 12-20

| | Polycarboxylic anhydride | | | |
|---|---|---|---|---|
| Example | (a) | (b) | (c) | Polyamine |
| 12 | Dibenzofuran-3,7,disulphonyl chloride | PA | TP | 4,4-oxydianiline. |
| 13 | Benzene 1,3-disulphonyl bromide | PA | TP | m-Phenylene diamine. |
| 14 | Tetrachlorobenzene-1,3-disulphonyl chloride | PA | TP | Do. |
| 15 | Naphthalene-1,3,6-trisulphonyl chloride | PA | TP | Do. |
| 16 | Benzene-1,3-disulphonyl chloride | PPA | BP | p-Phenylene diamine. |
| 17 | do | PPA | BP | 4,4-diaminobenzophenone. |
| 18 | do | CPA | BP | 4,4-methylene dianiline. |
| 19 | do | PMDA | DPS | m-Phenylene diamine. |
| 20 | do | PA | BN | Do. |

NOTE: BN=binaphthyl; BP=biphenyl; CPA=chlorophthalic anhydride; DPS=diphenylsulfone; PA=phthalic anhydride; PMDA=pyromellitic dianhydride; PPA=phenylphthalic anhydride.

As stated above the polymeric compositions of the present invention can be used as electrical insulation, thermal insulation, surface coatings, impregnating resins, structural adhesives, free films, foams, molding powders, etc.

This present invention contemplates the use of additives or adjuncts commonly used with polymeric compositions such as stabilizers, fillers, extenders, adhesion promotors, blowing agents, foaming agents, etc.

In view of the foregoing it is obvious that many deviations may be made in the products or processes set forth above without departing from the scope of this invention.

What is claimed is:

1. A composition of matter having a plurality of recurring imide linkages and direct aromatic nuclei to aromatic nuclei linkages, said composition comprising the polymeric reaction product of a polycarboxylic anhydride and a polyamine having at least two primary amino groups per molecule; wherein the polycarboxylic anhydride is the thermal condensation product of:
  (a) an aromatic polysulphonyl halide;
  (b) an aromatic intramolecular carboxylic anhydride which, except for having replaceable nuclear hydrogen atoms, is inert to the aromatic polysulphonyl halide; and
  (c) a third aromatic compound which contains replaceable nuclear hydrogen atoms which is selected from the group consisting of biphenyl, terphenyl, binaphthyl, quinquephenyl, sexiphenyl, septaphenyl, diphenoxy-terphenyl, diphenoxy-quaterphenyl, bis-phenoxy-biphenylyl ether, bis-phenylthio-biphenylyl ether, diphenyl sulphone, bis-(dibenzothienyl)benzene, and bis-dibenzofuranyl-diphenyl ether;
    wherein the thermal condensation of (a), (b) and (c) is carried out at a temperature of at least 175° C. under conditions such that sulphur dioxide and hydrogen halide are evolved; and wherein the polycarboxylic anhydride is prepared from 0.5 to 2.5 moles of anhydride per equivalent of the sulphonyl halide and a molar ratio of the third aromatic compound to the aromatic polysulphonyl halide not greater than the number of sulphonyl halide groups in the aromatic polysulphonyl halide.

2. The composition of claim 1 wherein the aromatic polysulphonyl halide and the aromatic intramolecular carboxylic anhydride used to prepare the polycarboxylic anhydride are benzene disulphonyl chloride and phthalic anhydride respectively.

3. The composition of claim 2 wherein the third aromatic compound is terphenyl.

4. The composition of claim 1 wherein the polyamine is selected from the group consisting of m-phenylenediamine and p-phenylenediamine.

5. The composition of claim 1 wherein the polyamine is a diamine the molecule of which contains two benzene nuclei linked directly through a divalent radical selected from the group consisting of an oxygen, sulphur, alkylene, haloalkylene, carbonyl, and sulphonyl wherein each benzene nucleus contains one amino group.

6. The composition of claim 1 wherein the polyanhydride is prepared from:
  (a) benzene disulphonyl chloride,
  (b) phthalic anhydride,
  (c) terphenyl
    wherein the molecular ratio of (a) to (b) to (c) is 1:1.5 to 3:0.4 to 0.9.

7. The composition of claim 1 wherein the polyamine is selected from the group consisting of m-phenylenediamine, p-phenylenediamine, dianiline and 4,4'-methylene dianiline.

8. A composition of matter comprising in admixture:
  (1) a partial ester of a polycarboxylic anhydride having a plurality of direct aromatic nuclei to aromatic nuclei linkages,
    wherein the alcohol moiety of the ester is a lower alkyl alcohol containing from 1 to 6 carbon atoms; and
  (2) a polyamine having at least two primary amino groups per molecule;
    wherein the polycarboxylic anhydride is the thermal condensation product of:
      (a) an aromatic polysulphonyl halide;
      (b) an aromatic intramolecular carboxylic anhydride which, except for having replaceable nuclear hydrogen atoms, is inert to the aromatic polysulphonyl halide; and
      (c) a third aromatic compound which contains replaceable nuclear hydrogen atoms which is selected from the group consisting of biphenyl, terphenyl, binaphthyl, quinquephenyl, sexiphenyl, septaphenyl, diphenoxy-terphenyl, diphenoxyquaterphenyl, bisphenoxy-biphenylyl ether, bis-phenylthio-biphenylyl ether, diphenyl sulphone, bis-(dibenzothienyl)benzene, and bis-dibenzofuranyldiphenyl ether;
        wherein the thermal condensation of (a), (b) and (c) is carried out at a temperature of at least 175° C. under conditions such that sulphur dioxide and hydrogen halide are evolved; and wherein the polycarboxylic anhydride is prepared from 0.5 to 2.5 moles of anhydride per equivalent of the sulphonyl halide and a molar ratio of the third aromatic compound to the aromatic polysulphonyl halide not greater than the number of sulphonyl halide groups in the aromatic polysulphonyl halide.

9. A composition of matter having a plurality of recurring imide linkages and direct aromatic nuclei to aromatic nuclei linkages which is the thermal reaction product of the composition of matter of claim 8.

10. The composition of claim 8 wherein the alcohol moiety of the ester derivative is ethanol.

11. The composition of matter of claim 8, dissolved in an organic solvent selected from the group consisting of N-alkylpyrrolidone and N,N-dialkyl carboxamide.

12. A composition of matter having a plurality of recurring imide linkages and direct aromatic nuclei to aromatic nuclei linkages, said composition comprising the polymeric reaction product of
  (1) a polycarboxylic component selected from the group consisting of polycarboxylic anhydrides and their partial alkyl esters; and
  (2) an aromatic polyamine having at least two primary amino groups per molecule;
    wherein the alcohol moiety of the ester is an alkyl alcohol containing from 1 to 6 carbon atoms; wherein the polycarboxylic component is the thermal condensation product of:
      (a) an aromatic polysulphonyl chloride which contains from 2 to 3 sulphonyl chloride groups per molecule;
      (b) an aromatic intramolecular carboxylic anhydride which, except for having replaceable nuclear hydrogen atoms, is inert to the aromatic polysulphonyl halide; and
      (c) a third aromatic compound which contains replaceable nuclear hydrogen atoms which is selected from the group consisting of biphenyl, terphenyl, binaphthyl, quinquephenyl, sexiphenyl, septaphenyl, diphenoxy-terphenyl, diphenoxy-quaterphenyl, bis-phenoxy-biphenylyl ether, bis-phenylthio-biphenylyl ether, diphenyl sulphone, bis(dibenzothienyl)benzene, and bis-dibenzofuranyldiphenyl ether;
        wherein the thermal condensation of (a), (b) and (c) is carried out at a temperature of at least 175° C. under conditions such that sulphur dioxide and hydrogen chloride are evolved; and wherein the polycarboxylic anhydride is prepared from 0.5 to 2.0 moles of anhydride per equivalent of the sulphonyl chloride and a molar ratio of the third aromatic compound to the aromatic polysulphonyl chloride not greater than the number of sulphonyl chloride groups in the aromatic polysulphonyl chloride.

13. A composition of matter as in claim 12 wherein the alcohol used to prepare the ester derivatives is ethanol.

14. A composition of matter having a plurality of recurring imide linkages and direct aromatic nuclei to aromatic nuclei linkages, said compositions comprising the polymeric reaction product of a polycarboxylic anhydride and a polyamine having at least two primary amino groups per molecule; wherein the polycarboxylic anhydride is the thermal condensation product of:
  (a) benzene disulphonyl chloride;
  (b) phthalic anhydride; and
  (c) terphenyl
    wherein the thermal condensation of (a), (b) and (c) is carried out at a temperature of at least 175° C. under conditions such that sulphur dioxide and hydrogen halide are evolved; and wherein the molar ratio of reactants is in the range of from 1.5 to 3 moles of phthalic anhydride and from 0.4 to 0.9 moles of terphenyl per mole of benzene disulphonyl chloride.

References Cited
UNITED STATES PATENTS

| | | | |
|---|---|---|---|
| 3,179,634 | 4/1965 | Edwards | 260—78 |
| 3,288,754 | 11/1966 | Green | 260—47 |
| 3,338,859 | 8/1967 | Green | 260—30.2 |
| 3,349,061 | 10/1967 | Prunckmayr | 260—47 |
| 3,413,267 | 11/1968 | Kreuz | 260—47 |

WILLIAM H. SHORT, Primary Examiner

H. SCHAIN, Assistant Examiner

U.S. Cl. X.R.

117—128.4, 132, 161; 156—331; 161—205, 227; 260—30.6, 30.8, 32.6, 33.8, 37, 46.5, 47, 49, 65, 78

PO-1050
(5/69)

UNITED STATES PATENT OFFICE
CERTIFICATE OF CORRECTION

Patent No. 3,575,914      Dated April 20, 1971

Inventor(s) Frank Long & Gordon R. Ensor

It is certified that error appears in the above-identified patent and that said Letters Patent are hereby corrected as shown below:

Column 13, line 23, "3,3',3'3'-biphenyl tetracarboxylic dianhydride" shou read - - - 3,3',3,3'-biphenyl tetracarboxylic dianhydride - - -.

Column 13, line 46 "reepated" should read - - - repeated - - -.

Column 15, line 54, in Claim 7, "Claim 1" should read - - - Claim 14 - -

Signed and sealed this 24th day of August 1971.

(SEAL)
Attest:

EDWARD M. FLETCHER, JR.
Attesting Officer

WILLIAM E. SCHUYLER, JR.
Commissioner of Patents